US012744900B2

(12) United States Patent
Leléannec et al.

(10) Patent No.: US 12,744,900 B2
(45) Date of Patent: Sep. 22, 2026

(54) METHODS AND APPARATUS OF ENCODING/DECODING VIDEO PICTURE PARTITIONED IN CTU GRIDS

(71) Applicant: Beijing Xiaomi Mobile Software Co., Ltd., Beijing (CN)

(72) Inventors: Fabrice Leléannec, Beijing (CN); Pierre Andrivon, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/850,354

(22) PCT Filed: Feb. 22, 2023

(86) PCT No.: PCT/CN2023/077751
§ 371 (c)(1), (2) Date: Sep. 24, 2024

(87) PCT Pub. No.: WO2023/185334
PCT Pub. Date: Oct. 5, 2023

(65) Prior Publication Data
US 2025/0220172 A1 Jul. 3, 2025

(30) Foreign Application Priority Data
Mar. 31, 2022 (EP) .................................... 22305408

(51) Int. Cl.
*H04N 19/119* (2014.01)
*H04N 19/184* (2014.01)
*H04N 19/96* (2014.01)

(52) U.S. Cl.
CPC ......... *H04N 19/119* (2014.11); *H04N 19/184* (2014.11); *H04N 19/96* (2014.11)

(58) Field of Classification Search
CPC .... H04N 19/119; H04N 19/184; H04N 19/96; H04N 19/14; H04N 19/172
(Continued)

(56) References Cited

U.S. PATENT DOCUMENTS

2021/0006783 A1 1/2021 Skupin et al.
2023/0388494 A1* 11/2023 Hong .................. H04N 19/176

FOREIGN PATENT DOCUMENTS

WO WO 2021/052794 A1 3/2021

OTHER PUBLICATIONS

Misra et al. ("An Overview of Tiles in HEVC", IEEE Journal, Dec. 2013). (Year: 2013).*

(Continued)

*Primary Examiner* — Matthew K Kwan
(74) *Attorney, Agent, or Firm* — Finnegan, Henderson, Farabow, Garrett & Dunner, L.L.P.

(57) ABSTRACT

A method for encoding a video picture into a bitstream of encoded video picture data, includes: splitting the video picture into rectangular picture areas, a size of at least one rectangular picture area being different from an integer multiple of a default size of coding-tree unit encoded into the bitstream; determining a grid of coding-tree units for each rectangular picture area, a grid of coding-tree units representing a spatial partition of a rectangular picture area, each coding-tree unit representing a sub-area of a rectangular picture area, the sub-area being subdivided according to a coding tree; obtaining encoded video picture data by encoding at least one coding unit (CU) of a coding tree associated with each coding tree unit (CTU) of each grid of coding-tree unit; and writing the encoded video picture data into the bitstream.

18 Claims, 11 Drawing Sheets

(58) Field of Classification Search
USPC .................................................... 375/240.12
See application file for complete search history.

(56) References Cited

OTHER PUBLICATIONS

ISA China National Intellectual Property Administration, International Search Report and the Written Opinion of the International Searching Authority Issued in Application No. PCT/CN2023/077751, Jun. 2, 2023, WIPO, 11 pages.

Extended European Search Report Issued in Application No. 22305408.1 dated Sep. 28, 2022, 12 pages.

Agrafiotis, D. et al., "Towards Efficient Context-Specific Video Coding Based on Gaze-Tracking Analysis", ACM Transactions on Multimedia Computing, Communications and Applications, vol. 3, No. 4, Article 21, Dec. 2007.

Dalai, M. et al., "Segmentation Based Image Coding With Norm ∫ Error Control", Università degli Studi di Brescia, Dec. 15, 2004, 4 pages.

Misra, K.. et al., "Tools for Video Coding Beyond HEVC: Flexible Partitioning, Motion Vector Coding, Luma Adaptive Quantization, and Improved Deblocking", IEEE Transactions on Circuits and Systems for Video Technology, vol. 30, No. 5, May 2020, 13 pages.

* cited by examiner

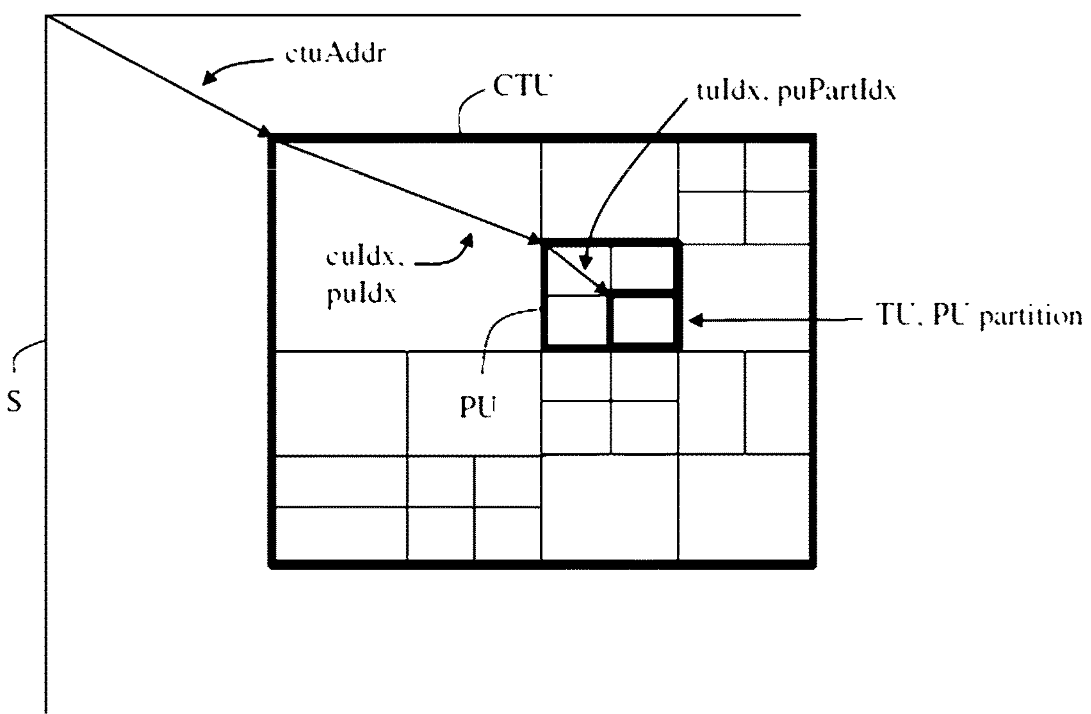
FIG. 1
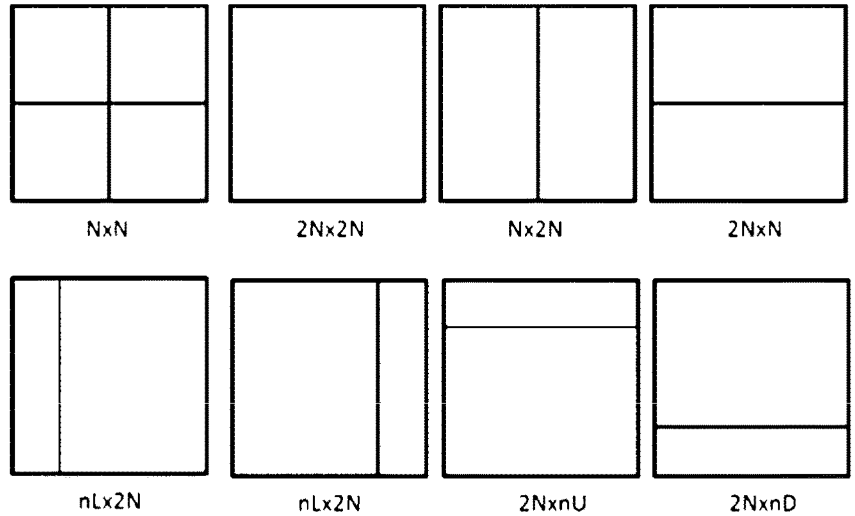
FIG. 2
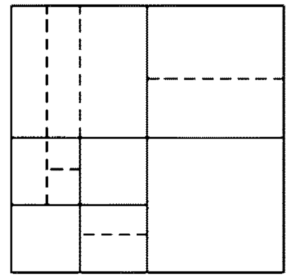
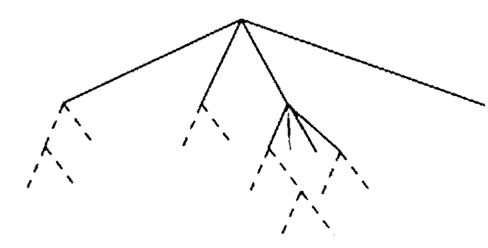
FIG. 3

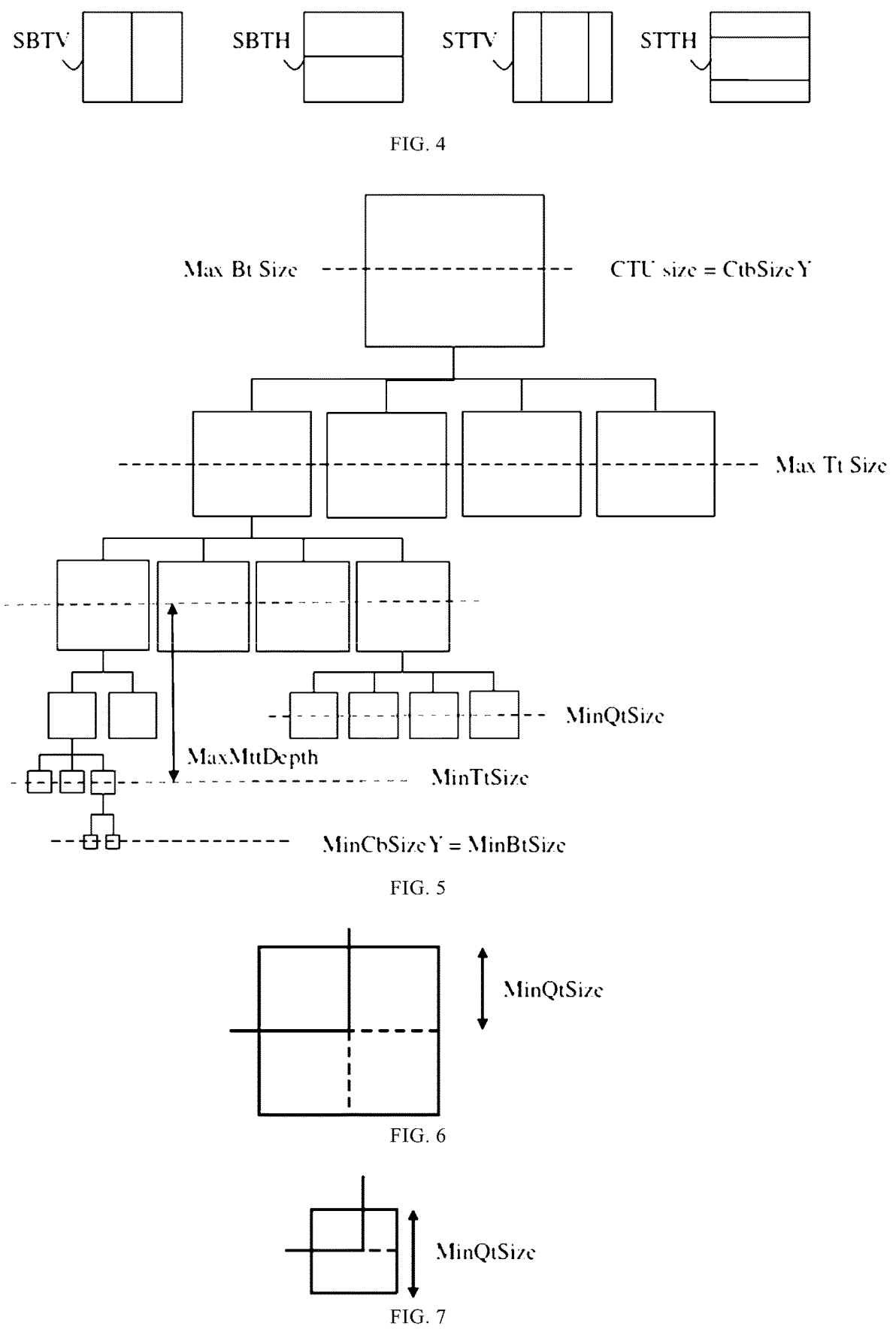

SBTV SBTH STTV STTH

FIG. 4

Max Bt Size
CTU size = CtbSizeY
Max Tt Size
MinQtSize
MaxMttDepth
MinTtSize
MinCbSizeY = MinBtSize

FIG. 5

MinQtSize

FIG. 6

MinQtSize

FIG. 7

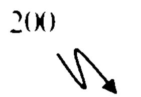
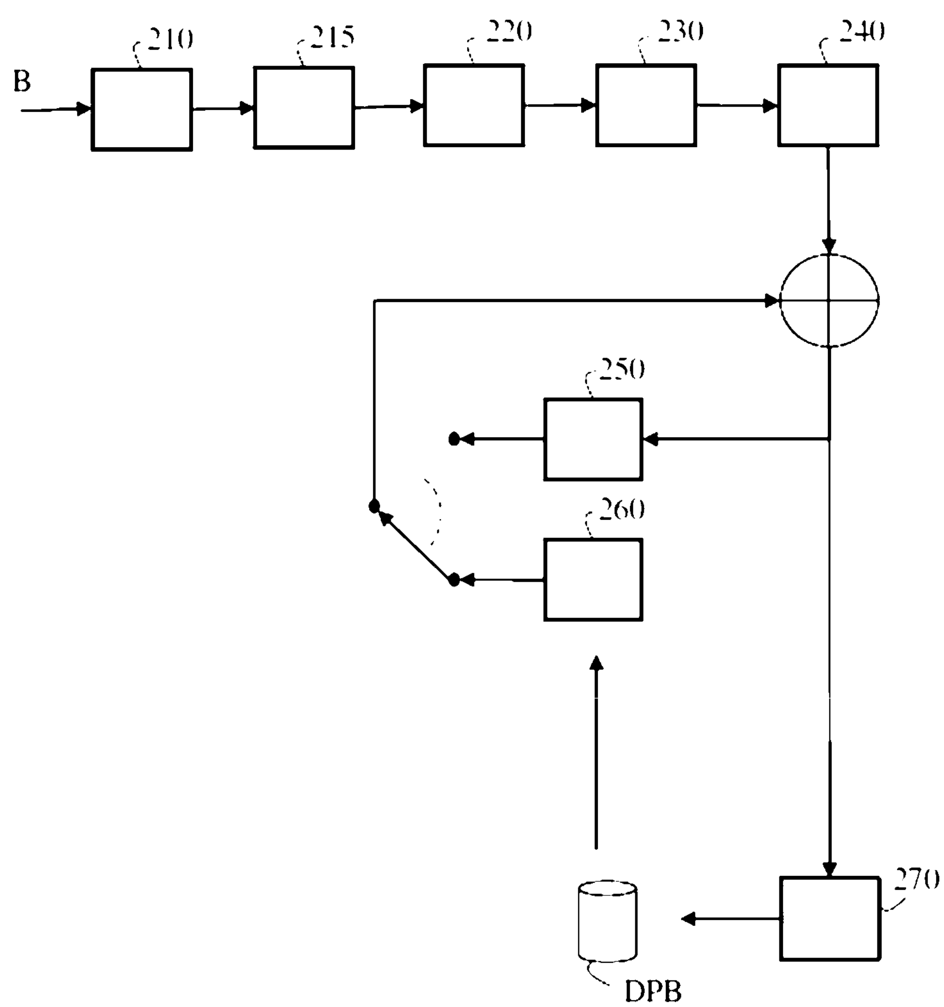
FIG. 17
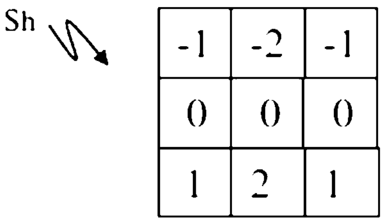
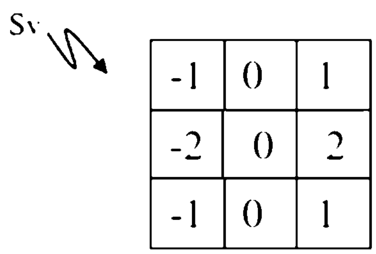
FIG. 18

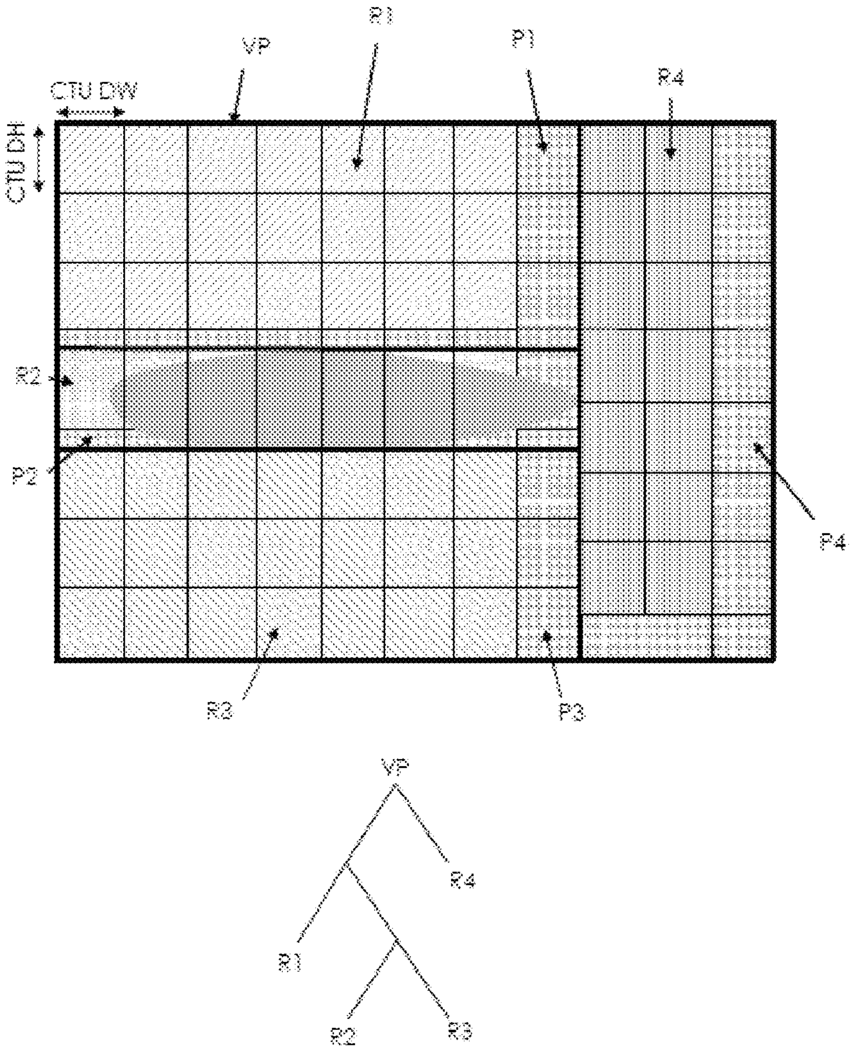

FIG. 20

| picture_tree_decomposition(x,y,width,height) { | Descriptor |
|---|---|
| **picture_binary_split_flag** | u(1) |
| if ( picture_binary_split_flag ) { | |
| **horizontal_split_flag** | u(1) |
| split_line_offset | ue(v) |
| if ( horizontal_split_flag ) { | |
| picture_tree_decomposition(x,y,width,split_line_offset) | |
| picture_tree_decomposition(x,y+split_line_offset,width,height-split_line_offset) | |
| } | |
| else { // vertical binary split | |
| picture_tree_decomposition( x, y, split_line_offset, height ) | |
| picture_tree_decomposition ( x+split_line_offset, y, width-split_line_offset, height ) | |
| } | |
| } | |
| } | |

FIG. 21

METHODS AND APPARATUS OF ENCODING/DECODING VIDEO PICTURE PARTITIONED IN CTU GRIDS

CROSS-REFERENCE TO RELATED APPLICATION

This application is the U.S. National Stage Application of International Application No. PCT/CN2023/077751, filed on Feb. 22, 2023, which claims priority to and benefits of EP Patent Application No. 22305408.1, filed on Mar. 31, 2022, the entire content of both of which is incorporated herein by reference.

FIELD

The present application generally relates to video picture encoding and decoding. Particularly, but not exclusively, the technical field of the present application is related to partitioning video picture in CTU grids for encoding/decoding of video picture data into/from a bitstream.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application. Accordingly, it should be understood that these statements are to be read in this light, and not as admissions of the prior art.

In the state-of-the-art video compression systems such as HEVC (ISO/IEC 23008-2 High Efficiency Video Coding, ITU-T Recommendation 11.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-1/en, low-level and high-level picture partitioning are provided to divide a video picture into picture areas so-called Coding-Tree Units (CTU) which size may be typically between 8×8 and 64×64 pixels for HEVC and 32×32, 64×64, or 128×128 pixels for VVC.

The CTU division of a video picture forms a grid of fixed size CTUs, namely a CTU grid, in which upper and left bounds spatially coincide with the top and left borders of the video picture. The CTU grid represents a spatial partition of the video picture.

Improving the flexibility of the representation of a CTU grid is required to improve the compression efficiency of a video picture but without increasing the number of CUs resulting of the partitioning of CTUs of the CTU grid.

SUMMARY

The following section presents a simplified summary of exemplary embodiments in order to provide a basic understanding of some aspects of the present application. This summary is not an extensive overview of an exemplary embodiment. It is not intended to identify key or critical elements of an exemplary embodiment. The following summary merely presents some aspects of exemplary embodiments in a simplified form as a prelude to the more detailed description provided elsewhere in the document.

According to a first aspect of the present application, there is provided a method for encoding a video picture into a bitstream of encoded video picture data. The method comprises splitting the video picture into rectangular picture areas, a size of at least one of said rectangular picture area being different from an integer multiple of a default size of coding-tree unit encoded into the bitstream; determining a grid of coding-tree units for each rectangular picture area, a grid of coding-tree units representing a spatial partition of a rectangular picture area, each coding-tree unit representing a sub-area of a rectangular picture area, said sub-area being subdivided according to a coding tree; obtaining encoded video picture data by encoding at least one coding unit of a coding tree associated with each coding tree unit of each grid of coding-tree unit; and writing the encoded video data into the bitstream.

According to a second aspect of the present application, there is provided a method of decoding a video picture from a bitstream of encoded video picture data. The method comprises determining multiple grids of coding-tree units; each grid of coding-tree units covering a rectangular picture area of the video picture; a size of at least one rectangular picture area being different from an integer multiple of a default site of coding-tree unit decoded from the bitstream; each coding-tree unit representing a sub-area of a rectangular picture area, said sub-area being subdivided according to a coding tree; obtaining video picture data by decoding at least one coding unit of a coding tree associated with each coding tree unit of each grid of coding-tree units from the bitstream; and obtaining the video picture from said video picture data.

According to a third aspect of the present application, there is provided a bitstream formatted to include encoded video picture data and obtained from a method according to the first aspect of the present application.

According to a fourth aspect of the present application, there is provided an apparatus comprising means for performing one of methods according to the first and/or second aspects of the present application.

According to a fifth aspect of the present application, there is provided a non-transitory storage medium carrying instructions of program code for executing a method according to the first and/or second aspects of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which:

FIG. 1 shows an example of coding-tree unit in accordance with HEVC;

FIG. 2 shows an example of partitioning coding units into prediction units in accordance with HEVC;

FIG. 3 shows an example of a CTU division in accordance with VVC;

FIG. 4 shows examples of split modes supported in the multi-type tree partitioning in accordance with VVC;

FIG. 5 shows examples of coding parameters used to configure the coding-tree representation of CTU in accordance with VVC;

FIG. 6 shows an example illustrating rules for partitioning video picture borders;

FIG. 7 shows an example illustrating rules for partitioning video picture borders;

FIG. 17 shows a schematic block diagram of steps of a method 200 of decoding a video picture VP in accordance with at least one exemplary embodiment;

FIG. 18 shows examples of edge detection filters in accordance with at least one exemplary embodiment;

FIG. 20 shows an example of partitioning of the video picture VP using a binary decomposition tree in accordance with an exemplary embodiment;

FIG. 21 shows an example of a syntax element picture_tree_decomposition that may be used to signal a split line offset slo in accordance with one exemplary embodiment;

Similar or same elements are referenced with the same reference numbers.

DESCRIPTION OF EXEMPLARY EMBODIMENTS

Figure 8:
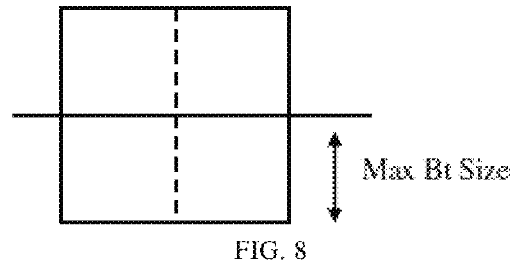
FIG. 8 shows an example illustrating rules for partitioning video picture borders.

Exemplary embodiments are described hereinafter with reference to the accompanying figures. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-1/en, low-level and high-level picture partitioning are provided to divide a video picture into picture areas so-called Coding-Tree Units (CTU) which size may be typically between 8×8 and 64×64 pixels for HEVC and 32×32, 64×64, or 128×128 pixels for VVC.

The CTU division of a video picture forms a grid of fixed size CTUs, namely a CTU grid, in which upper and left bounds spatially coincide with the top and left borders of the video picture. The CTU grid represents a spatial partition of the video picture.

In VVC and HEVC, the CTU size (CTU width and CTU height) of all the CTUs of a CTU grid equals a same default CTU size (default CTU width CTU DW and default CTU height CTU DH). For example, the default CTU size (default CTU height, default CTU width) may equal to 256 (CTU DW=CTU DH=256). A default CTU size (height, width) is encoded into the bitstream, for example at a sequence level in the Sequence Parameter Set (SPS).

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU.

A coding tree is associated with each CTU to determine a tree-division of the CTU.

As illustrated on FIG. 1, in HEVC, the coding tree is a quad-tree division of a CTU, where each leaf is called a Coding Unit (CU). The spatial position of a CU in the video picture is defined by a CU index cuIdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction parameters (prediction information). The intra or inter coding mode is assigned on the CU level. A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters (prediction information). The transform type is assigned on the TU level, and 2D separate transform is performed at TU level during the coding or decoding of a picture block.

The PU Partition types existing in HEVC are illustrated on FIG. 2. They include square partitions (2N×2N and N×N), which are the only ones used in both Intra and Inter CUs, symmetric non-square partitions (2N×N, N×2N, used only in Inter CUs), and asymmetric Partitions (used only in Inter CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines).

Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding shared by a luma and chroma component.

In intra video picture, i.e. video picture encoded without inter prediction, separated coding trees may be used, for luma component on one side and chroma components on the other side. The luma component part of a CTU is called a luma coding-tree block (luma CTB). A luma CTB is then associated with a coding tree, which leaves are associated to luma coding blocks. Furthermore, in the case of separated luma/chroma coding trees, in the case of a 3-components picture, the two chroma component parts of a CTU share a same coding tree called chroma coding-tree block (chroma CTB). A chroma CTB is then associated with a coding tree, which leaves are associated to chroma coding blocks.

Contrary to HEVC, in VVC, in most cases. CU. PU and TU have equal size, which means CUs are generally not partitioned into PUs or TUs, except in some specific coding modes.

Compared to HEVC, the block structures of VVC have increased flexibility, since a CU may be square or rectangular, and many rectangular block shapes are allowed. This increased flexibility of coding structure leads to approximately 15% increase in compression efficiency. i.e. 15% average bitrate reduction at equivalent picture quality.

FIG. 5 shows schematically examples of coding parameters used to configure a coding-tree partitioning in accordance with VVC.

The coding parameter CTU size refers to the root node size of a quaternary tree (or quad-tree). The coding parameter CtbSizeY refers to the size of a luma CTB. The coding parameter MinCbSizeY refers to a minimum allowed coded block size for luma (Y). The coding parameter MinQTSize refers to a minimum allowed quad-tree leaf size, the coding parameter MaxBtSize refers to a maximum allowed binary tree root node size, the coding parameter MaxTtSize refers to a maximum allowed ternary tree root node size, the coding parameter MaxMttDepth refers to a maximum allowed hierarchy depth of multi-type tree splitting from a quad-tree leaf, the coding parameter MinBtSize refers to a minimum allowed binary tree leaf size and the coding parameter MinTtSize refers to a minimum allowed ternary tree leaf size.

The size of a VVC-coded video picture is a multiple of 8. Thus, a video picture size may not consist in a set of entire CTUs, i.e. the video picture size may not be a multiple of 32, 64 or 128. In that case, some partial CTUs may exist on the bottom or the right side of the video picture. Some block partitioning rules are usually used to handle the block partitioning on the right and bottom video picture border.

In one exemplary embodiment of a block partitioning rule, if a tree node block (a block associated with a tree node) exceeds both the bottom and the right picture boundaries (FIG. 6), if the block may be associated with a quad-tree (QT) node and the size of the block is larger than MinQTSize, QT split mode may be forced (dotted lines), otherwise, SBTH split mode may be forced (FIG. 7).

Figure 9:
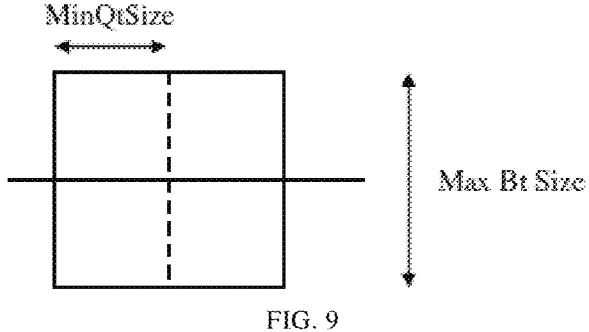
FIG. 9 shows an example illustrating rules for partitioning video picture borders.
Figure 10:
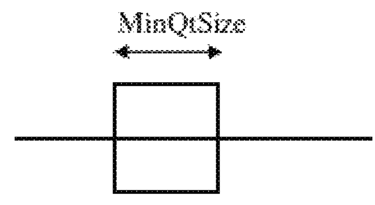
FIG. 10 shows an example illustrating rules for partitioning video picture borders.

If a tree node block exceeds either the bottom or the right video picture border, if the block is a quad-tree (QT) node, block size>MinQTSize, and block size>MaxBtSize, QT split may be forced (FIG. 8). Otherwise, if the block is a QT node and block size>MinQTSize and block size<=MaxBtSize, split may be forced, and the encoder may choose between QT or binary tree split with a forced boundary orientation (SBTH or SBTV) (FIG. 9). Otherwise (block is a multi-type tree node or size<MinQTSize), binary tree split may be forced in the picture boundary orientation (FIG. 10).

In VVC, a high-level picture partitioning is also provided in which, basically, a video picture may be partitioned into sub-pictures, slices, and tiles.

A tile is a sequence of CTUs that covers a rectangular picture area of a video picture. The CTUs in a tile are usually scanned in raster scan order within that tile. The tile size (width and height) is an integer multiple of the default CTU size (default CTU width and default CTU height).

A slice comprises an integer number of tiles or an integer number of consecutive complete CTU rows within a tile. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile. The slice size (width and height) is an integer multiple of the default CTU size (default CTU width and default CTU height).

Two modes of slices are supported, namely the raster-scan slice mode and the rectangular slice mode. In the raster-scan slice mode, a slice contains a sequence of complete tiles in a tile raster scan order of a video picture. In the rectangular slice mode, a slice contains either a number of complete tiles that collectively form a rectangular picture area or several consecutive complete CTU rows of one tile that collectively form a rectangular picture area. Tiles within a rectangular slice are scanned in tile raster scan order within the rectangular picture area corresponding to that slice.

A sub-picture contains one or more slices that collectively cover a rectangular picture area. Consequently, each sub-picture boundary is also always a slice boundary, and each vertical sub-picture boundary is always also a vertical tile boundary. The sub-picture size (width and height) is an integer multiple of the default CTU size (default CTU width and default CTU height).

One or both of the following conditions shall be fulfilled for each sub-picture and tile:

All CTUs in a sub-picture belong to the same tile.

All CTUs in a tile belong to the same sub-picture.

Figure 11:
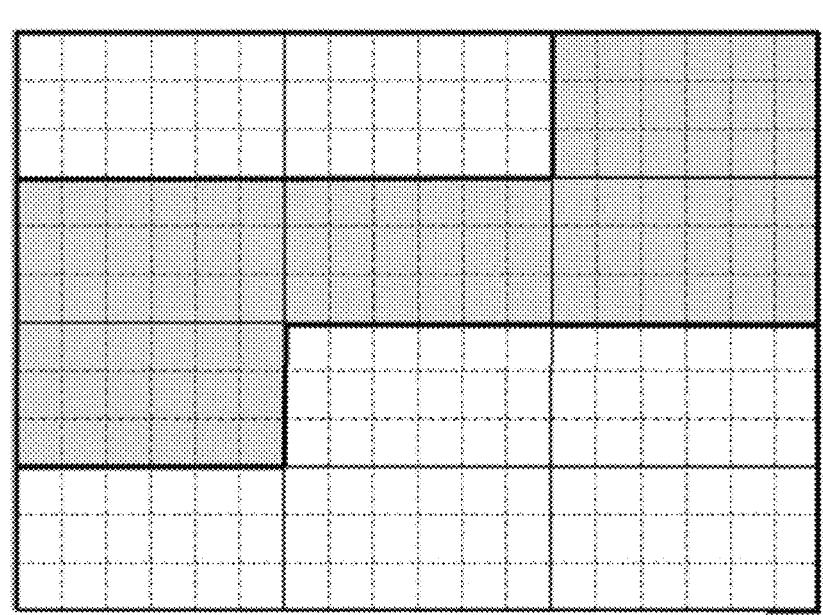
FIG. 11 shows an example of a video picture partitioning in the raster-scan slice mode.

FIG. 11 shows an example of a video picture partitioned with a 18×12 CTUs grid, 12 tiles of 6×3 CTUs each, and 3 raster-scan slices in the raster-scan slice mode (2 white shaded and 1 grey shaded).

Figure 12:
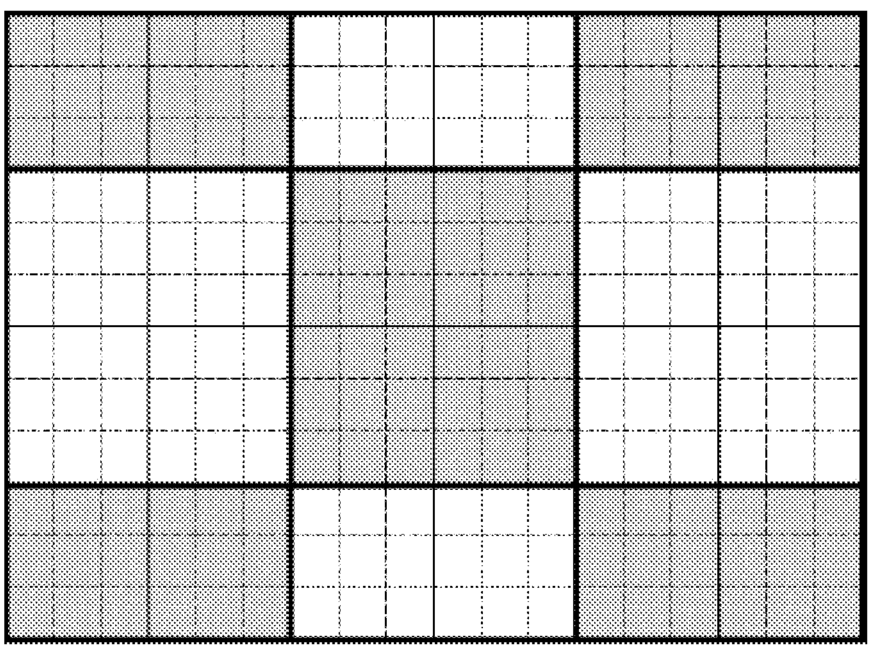
FIG. 12 shows an example of a video picture partitioning in the rectangular slice mode.

FIG. 12 shows an example of a video picture partitioned with a 18×12 CTUs grid, 24 tiles (6 tile columns of 3 CTUs width and 4 tile rows of 3 CTUs height) and 9 rectangular slices (4 white shaded and 5 grey shaded).

Figure 13:
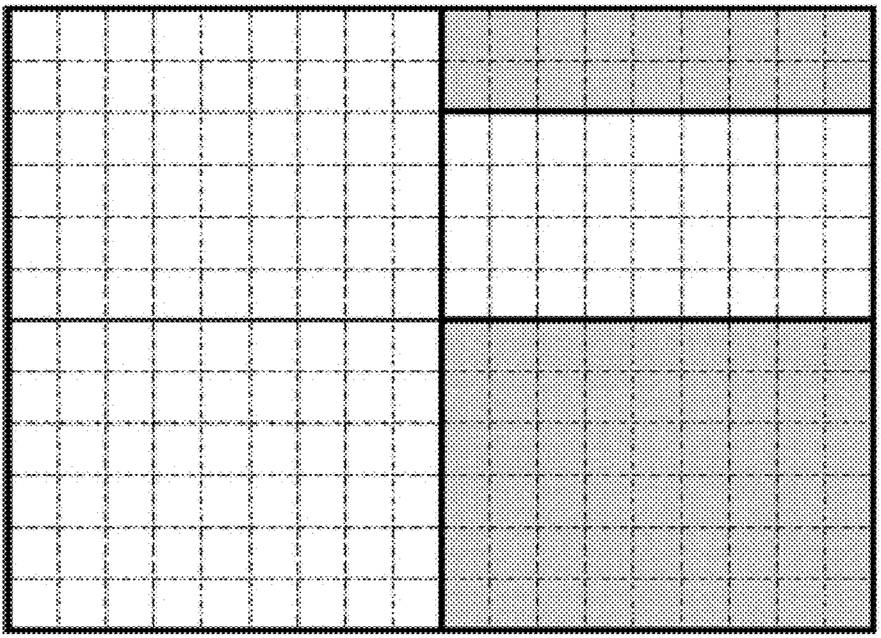
FIG. 13 shows an example of a video picture partitioned into tiles and rectangular slices.

FIG. 13 shows an example of a video picture partitioned with a 18×12 CTUs grid, 4 tiles (2 tile columns of 9×6 CTUs each) and 4 rectangular slices (2 white shaded and 2 grey shaded).

Figure 14:
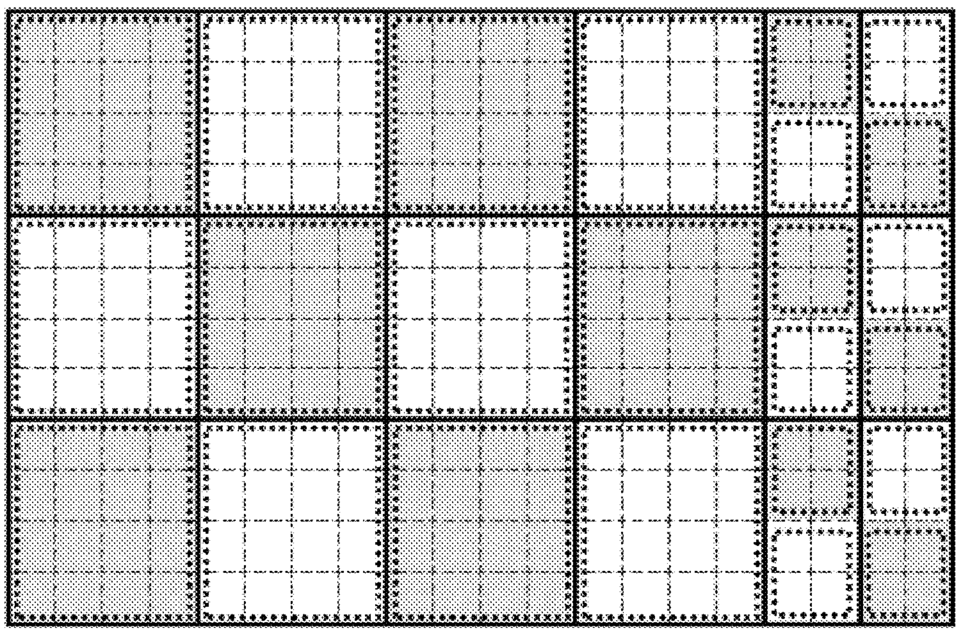
FIG. 14 shows an example of sub-picture partitioning of a video picture.

FIG. 14 shows an example of sub-picture partitioned with a 20×12 CTUs grid, 18 tiles (12 tiles each covering a slice of 4×4 CTUs, 6 tiles each covering 2 vertically-stacked slices of 2×2 CTUs) altogether resulting in 24 slices and 24 sub-pictures of varying dimensions (each slice is a sub-picture).

Also, the CTU grid is aligned to the top and left borders of the video picture. Therefore, the CTU partitioning into CUs is designed to optimize the encoding of the video picture VP by adapting the CUs sizes and by aligning the CUs to spatial structures of the video picture VP, i.e. to maximise CU sizes in areas with homogenous content in terms of spatial activity. The goal is to optimize the coding efficiency, typically by means of large CUs covering low spatial activity picture areas and smaller CUs covering a high spatial activity picture area.

Figure 15:
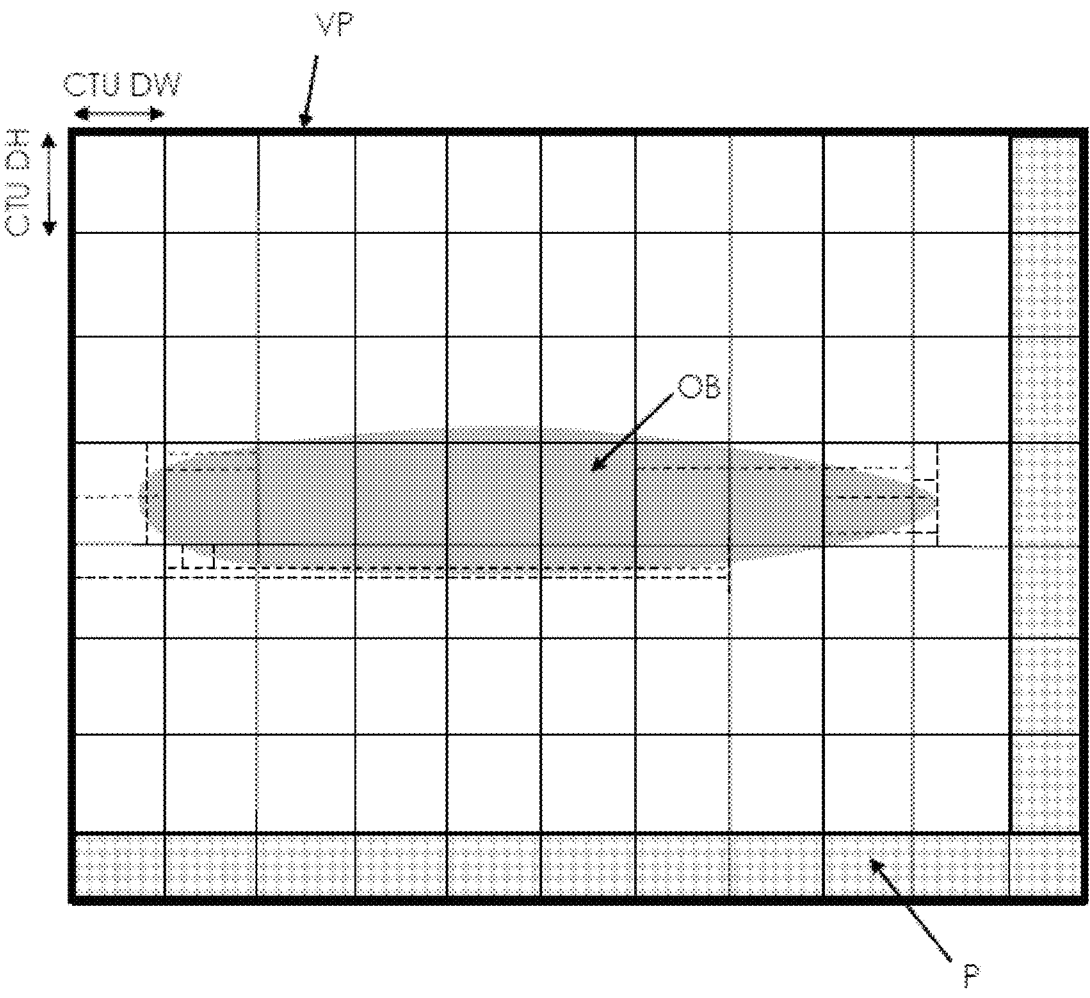
FIG. 15 shows an example of a fixed size CTU grid in accordance with the prior art.

Some CTUs are likely to cover picture areas corresponding to both low and high spatial activities as illustrated on FIG. 15 which shows an example of a video picture comprising a grey shaded object OB on a white background. In this example, the CTU grid is aligned with the top-left corner of the video picture VP and partial CTUs denoted P (areas with a checkerboard pattern) are shown on FIG. 15 located at the right and bottom borders of the video picture VP. In this example, only CTUs covering high spatial activities of the video picture are partitioned into CUs (dotted lines). To optimize the CU partitioning of a CTU covering both a low and high spatial activity picture area, low spatial activity parts of the CTU must be coded with large CUs (blocks) and the number of CUs covering both low and high spatial activity must be low. To reduce the number of CUs covering both low and high spatial activity, small CUs are used. This leads to an increase of the number of CUs, in particular of small CUs containing a low spatial activity picture area and thus a potential lack of compression efficiency since it is generally more efficient to compress a low activity picture area with CUs (blocks) as large as possible.

Improving the flexibility of the representation of a CTU grid is required to improve the compression efficiency of a video picture but without increasing the number of CUs resulting of the partitioning of CTUs of the CTU grid.

At least one of the aspects generally relates to video picture encoding and decoding, one other aspect generally relates to transmitting a bitstream provided or encoded and one of the other aspects relates to receiving/accessing a decoded bitstream.

At least one of the exemplary embodiments is described for encoding/decoding a video picture but extends to the encoding/decoding of video pictures (sequences of pictures) because each video picture is sequentially encoded/decoded as described below.

Moreover, the at least one exemplary embodiments are not limited to MPEG standards such as HEVC, VVC, AVC (ISO/IEC 14496-10 Advanced Video Coding for generic audio-visual services. ITU-T Recommendation H.264, https://www.itu.int/rec/T-REC-H.264-202108-P/en), EVC (ISO/IEC 23094-1 Essential video coding) but may be applied to other standards and recommendations such as AV1 (AOMedia Video 1, http://aomedia.org/av1/specification/) for example. The at least one exemplary embodiment may apply to pre-existing or future-developed, and extensions of any such standards and recommendations. Unless indicated otherwise, or technically precluded, the aspects described in the present application may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component determined by a specific picture/video format which specifies all information relative to pixel values and all information, which may be used by a display unit and/or any other device to display and/or to decode video picture data related to said video picture.

A video picture comprises at least one component usually expressed in the shape of an army of samples.

A monochrome video picture comprises a single component and a color video picture may comprise three components.

For example, a color video picture may comprise a luma (or luminance) component and two chroma components when the picture/video format is the well-known (Y, Cb, Cr) format or may comprise three color components (one for Red, one for Green and one for Blue) when the picture/video format is the well-known (R, G, B) format.

Each component of a video picture may comprise a same number of samples which equals to a number of pixels of a screen on which the video picture is intended to be displayed.

Alternatively, in the case of a video format comprises a luma component and two chroma component like the (Y, Cb, Cr) format, dependent on the color format considered, the chroma component may contained half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the position of a pixel in the screen.

It is common to consider a video picture as being a set of pixel values, each pixel being represented by at least one sample.

A block of a video picture, namely a picture block, is a set of samples of one component of the video picture. A block of at least one luma sample or a block of at least one chroma sample may be considered when the picture/video format is the well-known (Y, Cb, Cr) format, or a block of at least one color sample when the picture/video format is the well-known (R, G, B) format.

The at least one exemplary embodiment is not limited to a particular picture/video format.

Generally speaking, the present application relates to encoding/decoding a video picture into/from a bitstream of encoded video picture data. A high-level picture partitioning structure is defined to specify rectangular picture areas which size may not be equal to an integer multiple of the default CTU size (width and height) usually signaled in the Sequence Parameter Set (SPS) in existing compression standards. This is not achievable with the existing compression standards such as VVC because all high-level partitioning tools in VVC (slice, tile, sub-picture) define rectangular picture areas which are multiple of the default CTU size. The high-level picture partitioning structure defining such rectangular picture areas improve flexibility of the representation of the CTU grid.

At the encoding side, the present disclosure splits the video picture into rectangular picture areas. The size of at least one rectangular picture area is different from an integer multiple of the default size. A grid of coding-tree units is determined for each rectangular picture area. Encoded video picture data is obtained by encoding at least one coding unit of a coding tree associated with each coding tree unit of each grid of coding-tree unit; and the encoded video data is written into the bitstream.

On the decoding side, partitioning information data representative of multiple grids of coding-tree units is decoded from the bitstream, each grid of coding-tree units covering a rectangular picture area of the video picture; a size of at least one rectangular picture area being different from an integer multiple of the default size; each coding-tree unit having a size equals to a default CTU size signaled into the bitstream; each coding-tree unit representing a sub-area of a rectangular picture area, said sub-area being subdivided according to a coding tree. The grids of coding-tree units are determined from partitioning information data. Video picture data is obtained by decoding at least one coding unit of a coding tree associated with each coding tree unit of each grid of coding-tree units from the bitstream; and the video picture is obtained from said video picture data.

The present disclosure provides an easy mean of separating various picture areas with low and high spatial activity, so that they do not cohabit in the same CTUs. This way, video picture partitioning ensures that some low-activity areas of the video picture are encoded with blocks as large as desired, without interacting with some partitioning into small blocks which may happen for a neighbouring area with high spatial signal activity. Therefore, coding units, resulting of such CTU partitioning of rectangular picture areas, may likely cover homogenous spatial activity picture areas and improves the compression efficiency of the video picture.

Figure 16:
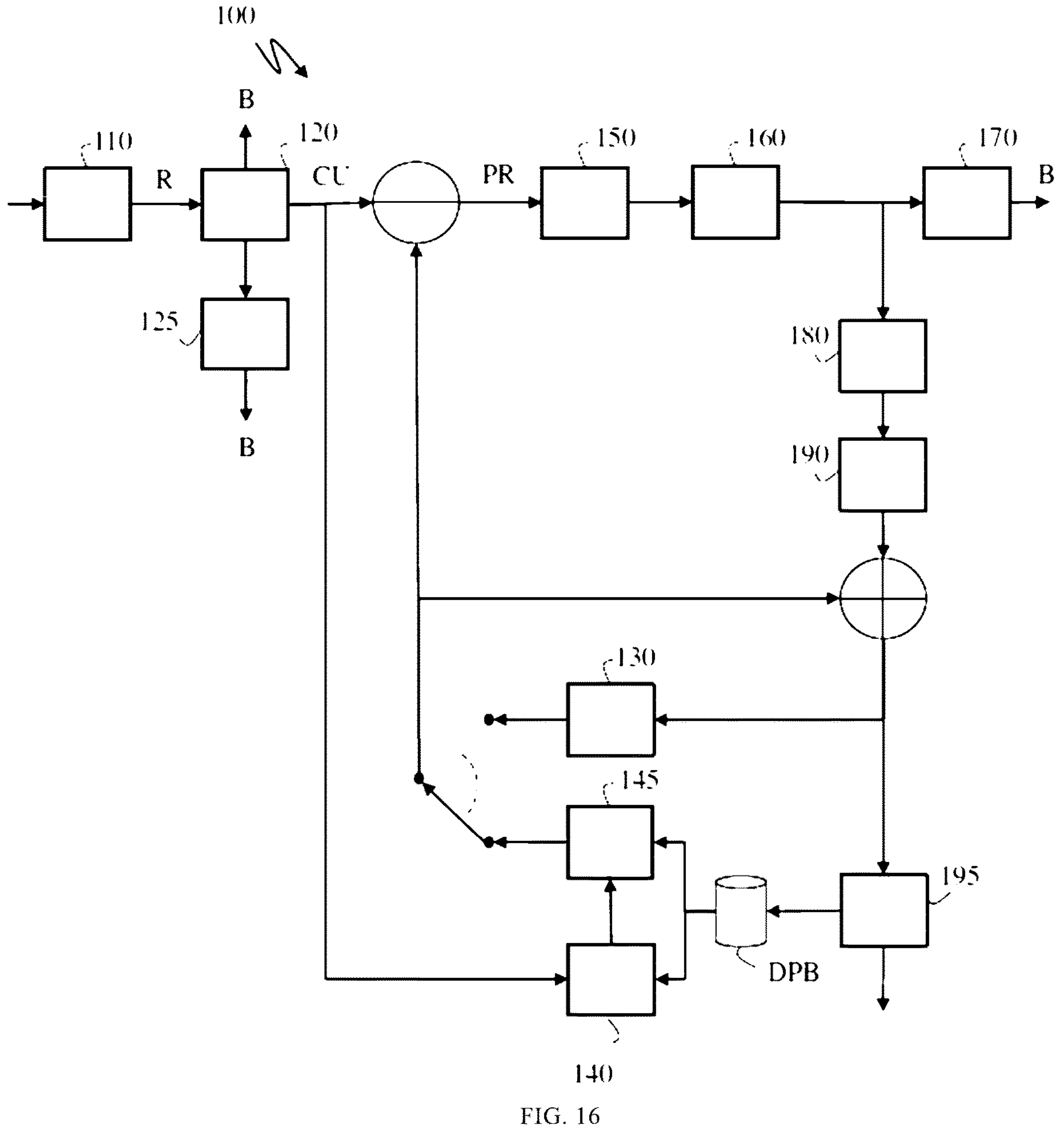
FIG. 16 shows a schematic block diagram of steps of a method 100 of encoding a video picture VP in accordance with at least one exemplary embodiment.

FIGS. 16 and 17 provide an overview of video encoding/decoding methods used in current video standard compression systems like VVC for example.

FIG. 16 shows a schematic block diagram of steps of a method 100 of encoding a video picture VP in accordance with at least one exemplary embodiment.

In step 110, the video picture VP is split into rectangular picture areas R. The size (either width or height or both) of at least one rectangular picture area R is different from an integer multiple of a default size signaled into the bitstream, i.e. width of said at least one rectangular picture area R is different from an integer multiple of the default width CTU DW or height of said at least one rectangular picture area R is different from an integer multiple of the default height CTU DH, or both.

In step 120, a CTU grid is determined for each rectangular picture area R.

A CTU grid determined for a rectangular picture area R represents a spatial partition of said rectangular picture area R. In other words, the CTU grid covers the rectangular picture R.

In a variant, partitioning information data representative of said CTU grid may be encoded (signaled) into a bitstream B.

In one exemplary embodiment of step 120, A CTU grid covering a rectangular picture area R may be determined as follows: when a distance between a CTU boundary and a vertical (respectively horizontal) boundary of a rectangular picture area R exceeds the default CTU width CTU DW (respectively the default CTU height CTU DH) then a new CTU column (respectively CTU row) with the default CTU width CTU DI (respectively default CTU width CTU DW) is added to the CTU grid covering the rectangular picture area R. When a distance between a vertical (respectively horizontal) boundary of the rectangular picture area R and a vertical (respectively horizontal) CTU boundary is lower than a threshold, e.g. null, then a new CTU boundary is added to complete a CTU column (respectively CTU row) of the CTU grid covering the rectangular picture area R. The new completed CTU column (respectively row) has a width (respectively a height) equals to the distance between the CTU boundary parallel to the new added CTU boundary.

Each CTU grid may comprise at least one CTU having size equal to the default size (widths equal to the default CTU size CTU DW and/or heights equal to the default CTU height CTU DI). Some of them may also comprise partial CTUs having sizes lower than the default size (widths lower than the default CTU size CTU DW and/or heights lower than the default CTU height CTU DH).

Each CTU grid is determined independently of other CTU grids. A dedicated partitioning of each rectangular picture area R into CTUs may then be performed, independently from the partitioning of other rectangular picture areas.

A coding tree is associated with each CTU of the CTU grid, each CU of a coding tree associated with each CTU being a block of samples of the rectangular picture area R. In short, a CU of a CTU is a block.

CTUs of the CTU grid are considered along a scanning order, usually a raster scan order of the rectangular picture area R. Each block of a CTU is also considered along a scanning order, usually a raster scan order of blocks of the CTU.

Each block of each CTU of each CTU grid is encoded in to the bitstream B using either an intra or inter prediction coding mode.

Intra prediction (step 130) consists in predicting a current block by means of a predicted block based on already encoded, decoded and reconstructed samples located around the current block, typically on the top and on the left of the current block. Intra prediction is performed in the spatial domain.

In inter prediction mode, motion estimation (step 140) and motion compensation (145) are performed. Motion estimation searches, in one or more reference video picture (s) used to predictively encode the current rectangular picture area R, a candidate reference block that is a good predictor of the current block. For instance, a good predictor of the current block is a predictor which is similar to the current block. The output of the motion estimation step 140 is one or more motion vectors and reference picture index (or indices) associated to the current block. Next, motion compensation (step 145) obtains a predicted block by means of the motion vector(s) and reference picture index (indices) determined by the motion estimation step 140. Basically, the block belonging to a selected reference picture and pointed to by a motion vector may be used as the predicted block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the predicted block samples.

Prediction information data is signaled in the bitstream B. The prediction information may comprise a prediction mode, prediction information coding mode, intra prediction mode or motions vector(s) and reference picture index (or indices) and any other information used for obtaining a same predicted block at the decoding side.

The method 100 selects one of the intra mode or inter coding mode by optimizing a rate-distortion trade-off considering the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p* for a current block given by:

$$p^* = \underset{p \in P}{\text{Argmin}}\{RD_{cost}(p)\} \quad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda \cdot R(p).$$

D(p) is the distortion between the current block and a reconstructed block obtained after encoding/decoding the current block with the candidate coding mode p, R(p) is a rate cost associated with the coding of the current block with coding mode p, and λ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 150) by using, for example, a DCT (discrete cosine transform) or DST (Discrete Sinus transform) type transform, and the obtained transformed coefficient block is quantized (step 160).

In a variant, method 100 may also skip the transform step 150 and apply quantization directly to the prediction residual block PR, according to the so-called transform-skip coding mode.

Quantized transform coefficient block (or quantized prediction residual block) is entropy encoded into the bitstream B (step 170).

Next, the quantized transform coefficient block (or the quantized residual block) is de-quantized (step 180) and inverse transformed (190) (or not), leading to a decoded prediction residual block. The decoded prediction residual block and the predicted block are then combined, typically summed, which provides the reconstructed block.

Other information data may also be entropy encoded for encoding a current block of the rectangular picture area R.

In-loop filters (step 195) may be applied to a reconstructed picture (comprising reconstructed blocks) to reduce compression artefacts. Loop filter may apply after all picture blocks are reconstructed. For instance, they consist in a deblocking filter. Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the rectangular picture area R.

FIG. 17 shows a schematic block diagram of steps of a method 200 of decoding a video picture VP in accordance with at least one exemplary embodiment.

In step 210, prediction information data and quantized transform coefficient block (or quantized residual block) are obtained by entropy decoding a bitstream B.

In step 215, multiple CTU grids are determined.

In a variant, in step 210, partitioning information data may be obtained by entropy decoding a bitstream B, and in step 215, multiple CTU grids are determined from partitioning information data.

Each CTU grid covers a rectangular picture area R of the video picture VP.

The size (either width or height or both) of at least one rectangular picture area is different from an integer multiple of a default size decoded from (signaled into) the bitstream B (width of said at least one rectangular picture area may be different from an integer multiple of the default width CTU DW or its height may be different from an integer multiple of the default height CTU DH, or both).

Each CTU grid may comprise at least one CTU having size equals to the default size (widths equal to the default CTU size CTU DW and/or heights equal to the default CTU height CTU DH). Some of them may also comprise partial CTUs having sizes lower than the default size (widths lower than the default CTU size CTU DW and/or heights lower than the default CTU height CTU DH).

Each CTU grid is obtained independently of other CTU grids.

A coding tree, obtained by decoding the bitstream B, is associated with each CTU of each CTU grid, each CU of a coding tree associated with a CTU being a block of samples of a rectangular picture area R covered by said CTU. In short, a CU of a CTU is a block.

CTUs of a CTU grid are considered along a scanning order, usually a raster scan order of the rectangular picture area R. Each block of a CTU are also considered along a scanning order, usually a raster scan order of blocks of the CTU.

Other information data may also be decoded from the bitstream B for decoding a current block of a current CTU of CTU grid.

In step 220, a current block of a current CTU of a current CTU grid is entropy decoded.

Each decoded current blocks may be either a quantized transform coefficient block or a quantized prediction residual block.

In step 230, a current block (of a current CTU) is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 16).

In one first exemplary embodiment of step 110, the video picture VP may be split into rectangular picture areas to separate picture areas with low spatial activity from picture areas with the high spatial activity of the video picture VP.

A rectangular picture area with low spatial activity means a rectangular picture area without (or with few) vertical or horizontal edges and a rectangular picture area with high spatial activity is a rectangular picture area with more horizontal and vertical edges than in a low spatial activity picture area.

Splitting the video picture VP based on the spatial activity of the video picture VP leads to obtain rectangular picture areas with particular width different from an integer multiple of the default CTU width CTU DW and/or rectangular picture areas with particular height different from an integer multiple of the default CTU height CTU DH.

The resulting rectangular picture areas R cover the most possibly homogeneous picture areas. In particular, leading to better compression efficiency of those areas. For instance. CTUs containing low spatial activity picture content are likely to contain only low spatial activity content, thus can be compressed with large CUs, leading to increased compression efficiency.

In a variant of the first exemplary embodiment of step 110, the spatial activity of the video picture VP may be determined by detecting vertical and horizontal edges from the video picture content (sample values).

For example, each sample of the video picture VP may be categorized as being either an edge sample or not, and a rectangular picture area R is considered as having a low spatial activity if the number of edge samples of said rectangular picture area R is lower than a threshold.

In a variant of the first exemplary embodiment of step 110, vertical and horizontal edges of the video picture VP may be detected by applying horizontal and vertical Sobel filters on the video picture VP. These Sobel filters have a very low complexity and are well adapted for tasks such as detecting horizontal and vertical edges from a picture content.

FIG. 18 shows an example of coefficients of a horizontal Sobel filter Sh and an example of coefficients of a vertical Sobel Filter Sv.

The present disclosure is not limited to a particular edge detecting but extends to any other well-known method for detecting edges in a video picture such as well-known Canny filter or any gradient-based edge detection method for example.

In a variant, post-edge detection filter may discard short edges possibly with a threshold, possibly based on a size related to the width, height of the video picture VP or the CTU size (height and/or width).

This variant is advantageous because only a limited number of vertical or horizontal edges are considered for determining at least one shifting offset.

In a variant of the first exemplary embodiment of step 110, rectangular picture area boundaries may be aligned with determined principal vertical and horizontal edges.

A vertical or horizontal edge is a separation between two sets of samples of the video picture VP, the samples of each set sharing particular picture properties. A vertical or horizontal edge also refers to an edge, which is approximately vertical or horizontal, i.e. an edge having an angle around +/−15 degrees from a vertical or horizontal line.

In a variant of the first exemplary embodiment of step 110, a vertical or horizontal boundary of a rectangular picture area R may be aligned with a vertical or horizontal edge by minimizing a spatial distance between said vertical or horizontal boundary and said vertical or horizontal edge. It is noted that the distance is measured orthogonally to an edge direction.

In a variant of the first exemplary embodiment of step 110, the height of a rectangular picture area R may be chosen as follows. Let a(x,y) denote the spatial activity measures at luma sample position (x,y), a(x,y) may for instance be measured through an edge detection filtering like the above-discussed Sobel filtering, or a morphological gradient computation, or a 2D gradient magnitude at spatial position (x,y). Let $H_0, \ldots, H_N$ be the possible height values that can be assigned to the current rectangular picture area. The selection process may select the height of the rectangular picture area according to the average spatial activity in the rectangular picture area. First, the average spatial activity in the potential rectangular picture area of height $H_0$ may be computed and compared to a threshold. If higher than the threshold, the potential rectangular picture area with height $H_0$ is of high spatial activity. Otherwise, it is of low spatial activity.

In a given strategy, if the rectangular picture area with minimum height $H_0$ is of high average spatial activity, then the rectangular picture area is given the minimum height $H_0$. Otherwise. i.e. if the potential rectangular picture area with height $H_0$ is of low average spatial activity, then the rectangular picture area of next candidate height $H_1$ is considered, and its average spatial activity is measured. The process then determines the maximum candidate rectangular picture area height for which the average spatial activity is measured as low. The rectangular picture area height may not be an integer multiple of the default CTU height CTU DH. A split line offset slo may identify the horizontal or vertical position of a line separating two rectangular spatial areas, determined according to any of the above rectangular region decision methods.

A similar strategy may further be employed to select the width of rectangular picture areas.

This "growing rectangular picture area size" strategy leads to the choice of large rectangular picture areas with low spatial activity which is the intent of the present disclosure.

Alternatively, if the rectangular picture area with minimum candidate height is of high measured spatial activity, then the maximum candidate height such that the considered rectangular picture area is also of high spatial activity may be chosen. This other strategy would ensure that maximum rectangular picture area sizes are used for the compression, under the constraint that homogeneous rectangular picture area in terms of spatial activity are coded. Similar strategy would then apply to the choice of the width of rectangular picture areas.

Figure 19:
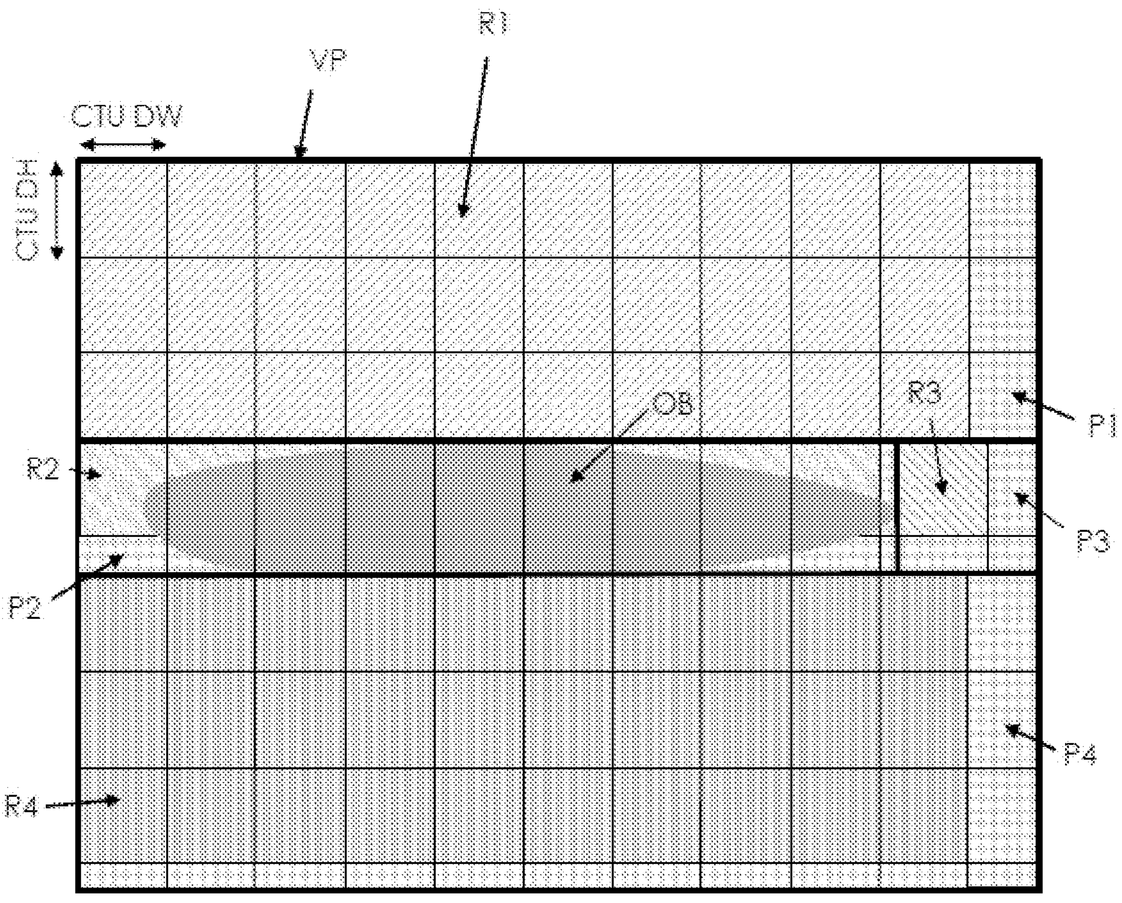
FIG. 19 shows an illustrated example of a video partitioning into rectangular picture areas in accordance with one exemplary embodiment.

FIG. 19 shows an example of a splitting of the video picture VP into 4 rectangular picture areas R1-R4 In this example, the video picture VP comprises an object OB delimited by the rectangular picture area R2. This may be done by splitting the video picture VP to separate rectangular picture areas with low spatial activity from the rectangular picture areas with the high spatial activity of the video picture VP as discussed above. Each CTU grid covering a rectangular picture area R is aligned to the top-left corner of that rectangular picture area R. Therefore, some partial CTUs may exist on the bottom and/or right side of the rectangular picture area R. As shown, the CTU grid covering the rectangular picture area R1 comprises partials CTUs P1 (areas with a checkerboard pattern) on the right border of the rectangular picture area R1, the CTU grid covering the rectangular picture area R2, respectively R3 and R4, comprises partials CTUs P2, respectively P3 and P4 on the right and bottom borders of the rectangular picture area P2, respectively P3 and P4.

Other partial CTUs may also exist when the CTU grids are aligned on other corners of the rectangular picture areas.

The video picture partitioning illustrated on FIG. 19 needs a reduced number of CUs, since mainly CTUs covering high spatial activities of the rectangular picture areas are partitioned into CUs (not shown on FIG. 19).

The object boundaries to code are spatially enclosed to a reduced number of CTUs compared to the second CTU row of FIG. 15. Thus the partitioning of large spatial areas into small CUs, needed to code the object boundaries, happens in a reduced number of CUs compared to the prior art. Covering each rectangular picture area R with a particular CTU grid allows to get large low spatial activity areas covered by a reduced number of CTUs and reduces the total number of CUs for partitioning said CTUs compared to the prior art, improving compression efficiency of the video picture VP.

In a second exemplary embodiment of step 110, the video picture VP may be decomposed according to a decomposition tree and at least one leaf of the decomposition tree is a rectangular picture area having size different from an integer multiple of the default size (width different from an integer multiple of the default width CTU DW and/or height different from an integer multiple of the default height CTU DII).

In a variant of the second exemplary embodiment of step 110, each rectangular picture area associated to each leaf of the decomposition tree may be assigned its own CTU grid.

In a variant of the second exemplary embodiment of step 110, the decomposition tree may be a binary decomposition tree splitting recursively each parent node into two child nodes.

The present application is not limited to a particular decomposition tree but extends to any decomposition tree such as ternary tree.

FIG. 20 shows an example of partitioning of the video picture VP using a binary decomposition tree in accordance with an exemplary embodiment.

In this example, the video picture VP is first vertically divided into a left picture area and a right picture area that forms a rectangular picture area R4. Note splitting a picture area according to a binary decomposition tree does not involve the left and right picture areas have the same sizes. The left picture area is then horizontally divided into an upper picture area that forms the rectangular picture area R1 and a lower picture area. The lower picture area is finally horizontally divided into two rectangular picture areas R2 and R3.

In a variant of the second exemplary embodiment of step 110, each parent node of a binary decomposition tree may be split into two child nodes based on a split line offset slo that defines a line separating two sub-areas associated with the child nodes.

In a variant of the second exemplary embodiment of step 110, in step 125, the split line offsets slo associated to each split node of the decomposition tree may be encoded (signaled) into the bitstream B.

FIG. 21 shows an example of a syntax element picture_tree_decomposition that may be used to signal a split line offset slo.

The syntax element of FIG. 21 recursively signals a binary value (flag) picture_binary_split_flag indicating that a current rectangular picture area R (associated with a current parent node of the decomposition tree) is split into two sub-areas. If the flag picture_binary_split_flag is true, then a binary value (flag) horizontal_split-flag indicates if the split is an horizontal split or a vertical split, and an integer value split_line_offset represents the split line offset slo. Next, the syntax is invoked recursively on each sub-areas resulting from the current split operation.

Figure 22:
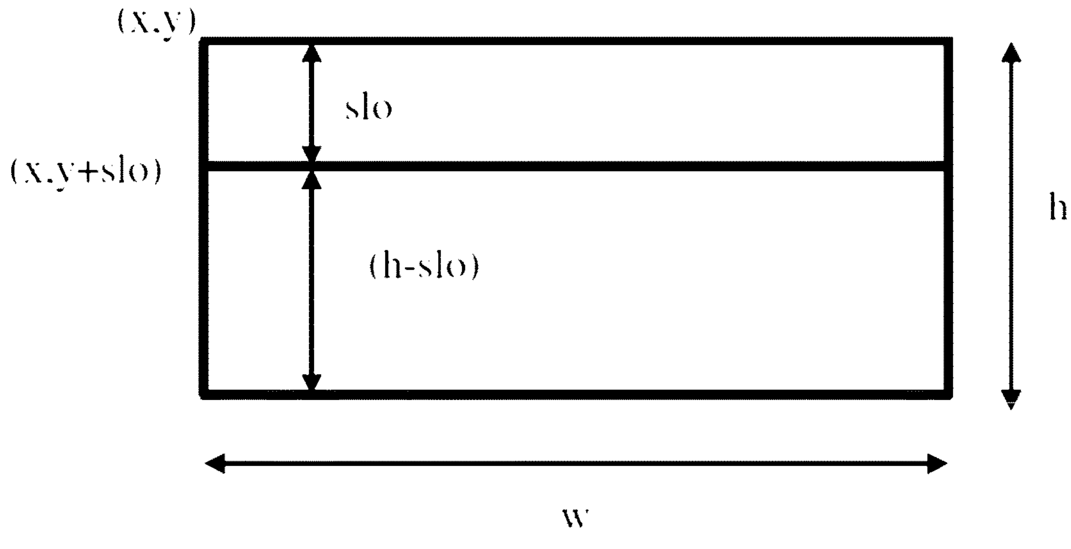
FIG. 22 shows an example of a vertically split of a rectangular picture area associated with a current node of the binary decomposition tree.

FIG. 22 shows an example of a vertically split of a rectangular picture area associated with a current node of the binary decomposition tree.

Assuming the top-left corner of a current rectangular picture area Rat a (x,y) position in the video picture VP, the ordinate of the split line is given by (y+slo). The upper sub-area has a width equals to the width w and a height equals to slo. The lower sub-area has thus a width equals to the width w of the current rectangular picture area R and a height equals to (h−slo) where h is the height of the current rectangular picture area R.

In variants of the first or second exemplary embodiment, the rectangular picture areas R may be defined from sub-pictures, tiles or slices as defined in VVC or HEVC.

In variants of the first or second exemplary embodiment, a sub-picture row and column size, a tile row and column size or a slice row and column size, all expressed in luma samples, may be encoded (signalled) into the bitstream B.

In variants of the first or second exemplary embodiment, the sub-picture row and column size, the tile row and column size or the slice row and column size may be encoded at a picture level, for example in a Picture Parameter Set.

In one exemplary embodiment of step 120, that may be combined with the first or second exemplary embodiment of step 110 or one of their variants, a CU partitioning rule may be used to handle CU partitioning on partial CTUs of CTU grids defined for the rectangular picture areas R.

For example, when a CTU grid is aligned on the top-left corner of a rectangular picture area R, a CU partitioning rule may be used to handle CU partitioning of the CTUs on the right and bottom of the CTU grid. Said CU partitioning rules are quite the same as the block partitioning rules above discussed for VVC in relation with FIGS. 6 to 10.

In one exemplary embodiment of CU partitioning rule, the CU representing the root of the CTU may be given the default CTU size and may thus overlap the bottom or right boundary of the considered rectangular picture area R. Then, if the CU size>MinQTSize, and CU size>MaxBtSize, the CU may be considered as a QT node and QT split may be forced. Otherwise, if CU size>MinQTSize and CU size<=MaxBtSize, split may be forced, and the encoder chooses between QT and binary tree split in the horizontal (SBTH). Otherwise (size<MinQTSize). BT spit may be forced in the horizontal direction.

Then the same above policy is recursively applied to sub-CUs resulting from the CU split, and which do overlap the lower border of the considered partial CTU.

Alternatively, the partial CTUs in rectangular picture areas may be treated as follows. If the CTU size is equal to a supported CU sizes then it may be represented by a coding tree as for other complete CTU. If not, the case of a CTU width not equal to a supported CU size may be handled in a similar way as in the picture border handling of VVC and is easily deduced from it.

Figure 23:
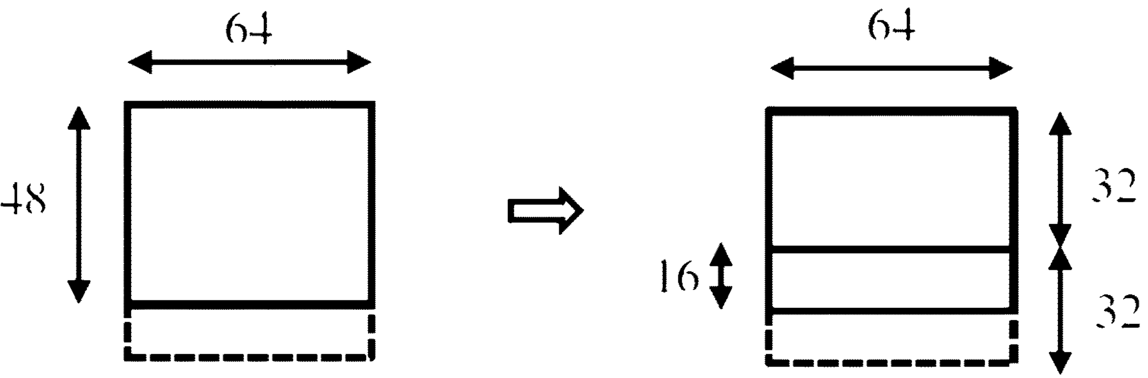
FIG. 23 shows an example of CU partitioning in accordance with at least one exemplary embodiment.

As an example, illustrated on FIG. 23, if a CTU height is 48, the CU that serves as the root node of the coding-tree associated with said CTU is given the supported size 64. Next, the lower border of the CTU is considered as if it was the lower bound of the video picture VP. This means CU splitting is forced until only entire CUs are contained in the considered CTU. Here, the CU is split into a first 64×32 sub-CU and a second 64×16 sub-CU.

In variant, the encoder may choose how to align a supra-CU that represents a coding-tree root node of a coding-tree associated with a CTU, relative to the CTU boundaries.

Figure 24:
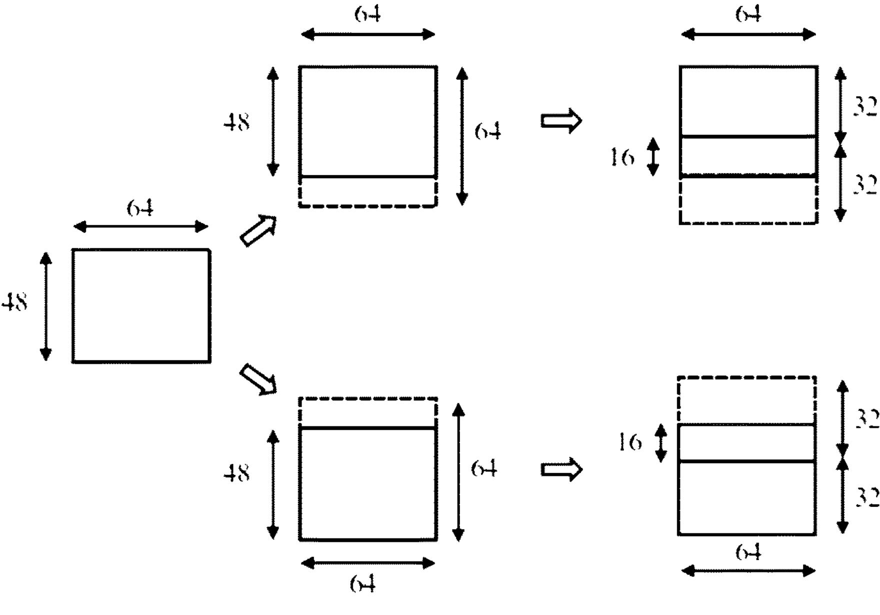
FIG. 24 shows an example of CTU alignment in accordance with at least one exemplary embodiment.

For instance, if the CTU height is not a CU height supported by the encoder, the encoder chooses between aligning the supra-CU to the top boundary of the CTU or to the bottom boundary of the CTU as illustrated on FIG. 24.

The advantage of such exemplary embodiment is that the encoder may find the most optimal coding-tree arrangement in term of compression efficiency, leading to better coding efficiency than previous exemplary embodiments.

In variant, a syntax element (typically a 2-bit syntax element) may be encoded into the bitstream B to indicate the way the supra-CU is aligned relatively to the CTU boundaries (either to the top, bottom, left or right boundary of the CTU).

Alternatively, a syntax element comprising x- and y-offsets may be encoded into the bitstream B to indicate the coordinates of a first entire CTU of a CTU grid associated with a rectangular picture area R, said x- and y-offsets being defined relatively to a corner of the rectangular picture area, preferably from the top-left corner.

In one exemplary embodiment of step 120, that may be combined with the first or second exemplary embodiment of step 110 or one of their variants, a single CTU grid may be obtained by partitioning a rectangular picture area. Said CTU grid is thus used for encoding/decoding each component of the rectangular picture area (e.g. luma and chroma samples) by accounting the possible sample ratio that links the luma and chroma channels (components).

In one exemplary embodiment of step 120, that may be combined with the first or second exemplary embodiment of step 110 or one of their variants, a CTU grid may be determined per component of a rectangular picture area.

For example, a luma component of a rectangular picture area is partitioned into a luma CTU grid and a chroma component of the rectangular picture area is partitioned into a chroma CTU grid different from the luma CTU grid.

The separate definition of luma and chroma CTU grids consists in determining, encoding, and decoding separate CTU grids for luma channel on one side, and chroma channels on the other side.

In a variant of the first or second exemplary embodiment of step 110, the dimensions of rectangular picture areas R, e.g. of CTU sizes of CTU covering the rectangular picture areas R, possibly of tiles, slices or sub-picture, and the split line offset slo may be expressed in any spatial unit finer than the default CTU size. For example, this may take the form of integer multiple of 4 luma samples (which is the basic unit for representing coding data in VVC), such as 8 or 16 samples, etc.

In one exemplary embodiment of the method 100, step 110 may only split some video pictures of a video sequence into rectangular picture areas (step 110) and a CTU grid may be determined (step 120) for each of the rectangular picture areas of said video pictures.

In one exemplary embodiment of the method 100, a single CTU grid may be used for other video pictures of said video sequence as in the prior art.

In a variant of said last exemplary embodiment, steps 110 and 120 may only apply on Intra Random Access Picture (IRAP) pictures, or only picture in some specific temporal layers of the encoded video sequence.

In one exemplary embodiment of the method 100, the splitting of a video picture into rectangular picture areas R and, possibly, the CTU grids covering said rectangular picture areas R, may persist and be applied identically for several video pictures of a video sequence.

Figure 25:
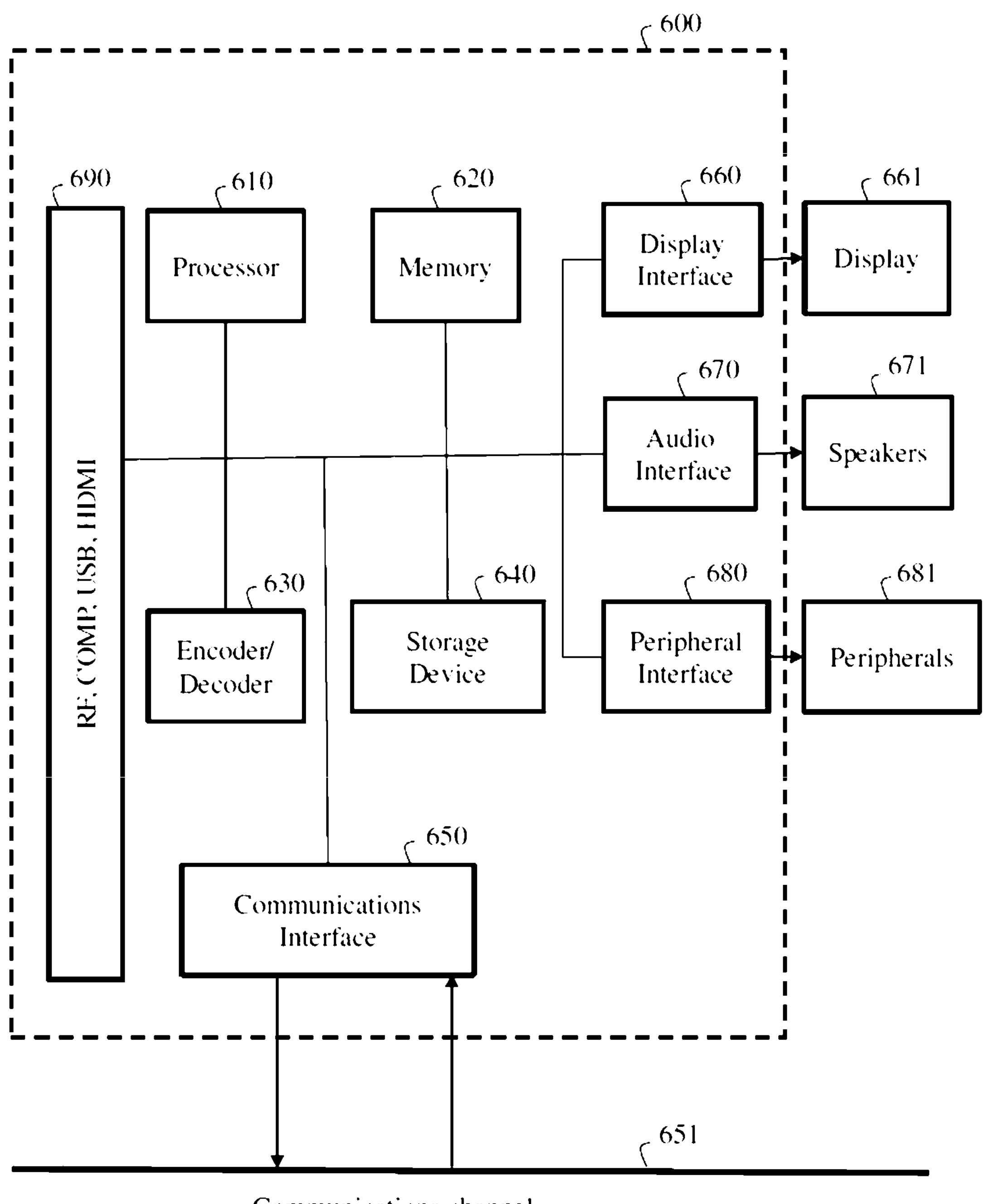
FIG. 25 illustrates a schematic block diagram of an example of a system in which various aspects and exemplary embodiments are implemented.

FIG. 25 shows a schematic block diagram illustrating an example of a system 600 in which various aspects and exemplary embodiments are implemented.

System 600 may be embedded as one or more devices including the various components described below. In various embodiments, system 600 may be configured to implement one or more of the aspects described in the present application.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 600, singly or in combination, may be embodied in a single integrated circuit (IC), multiple ICs, and/or discrete components. For example, in at least one embodiment, the processing and encoder/decoder elements of system 600 may be distributed across multiple ICs and/or discrete components. In various embodiments, system 600 may be communicatively coupled to other similar systems, or to other electronic devices, via, for example, a communications bus or through dedicated input and/or output ports.

System 600 may include at least one processor 610 configured to execute instructions loaded therein for implementing, for example, the various aspects described in the present application. Processor 610 may include embedded memory, input output interface, and various other circuitries as known in the art. System 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 640 may include an internal storage device, an attached storage device, and/or a network accessible storage device, as non-limiting examples.

System 600 may include an encoder/decoder module 630 configured, for example, to process data to provide encoded/decoded video picture data, and the encoder/decoder module 630 may include its own processor and memory. The encoder/decoder module 630 may represent module(s) that may be included in a device to perform the encoding and/or decoding functions. As is known, a device may include one or both encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present application may be stored in storage device 640 and subsequently loaded onto memory 620 for execution by processor 610. In accordance with various embodiments, one or more of processor 610, memory 620, storage device 640, and encoder/decoder module 630 may store one or more of various items during the performance of the processes described in the present application. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 610 and/or the encoder/decoder module 630 may be used to store instructions and to provide working memory for processing that may be performed during encoding or decoding.

In other embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/TEC 13818-2, also known as MPEG-2 Video), AVC, HEVC, EVC, VVC, AV1, etc.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to a baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital convener. In various embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the an, including the 12C bus, wiring, and printed circuit boards.

The system 600 may include a communication interface 650 that enables communication with other devices via communication channel 651. The communication interface 650 may include, but is not limited to, a transceiver configured to transmit and to receive data over communication channel 651. The communication interface 650 may include, but is not limited to, a modem or network card and the communication channel 651 may be implemented, for example, within a wired and/or a wireless medium.

Data may be streamed to system 600, in various embodiments, using a Wi-Fi network such as IEEE 802.11. The Wi-Fi signal of these embodiments may be received over the communications channel 651 and the communications interface 650 which are adapted for Wi-Fi communications. The communications channel 651 of these embodiments may be typically connected to an access point or router that provides access to outside networks including the Internet for allowing streaming applications and other over-the-top communications.

Other embodiments may provide streamed data to the system 600 using a set-top box that delivers the data over the HDMI connection of the input block 690.

Still other embodiments may provide streamed data to the system 600 using the RF connection of the input block 690.

The streamed data may be used as a way for signaling information used by the system 600. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various embodiments.

System 600 may provide an output signal to various output devices, including a display 661, speakers 671, and other peripheral devices 681. The other peripheral devices 681 may include, in various examples of embodiments, one or more of a stand-alone DVR, a disk player, a stereo system, a lighting system, and other devices that provide a function based on the output of system 600.

In various embodiments, control signals may be communicated between the system 600 and the display 661, speakers 671, or other peripheral devices 681 using signaling such as AV.Link (Audio/Video Link). CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 651 via the communications interface 650. The display 661 and speakers 671 may be integrated in a single unit with the other components of system 600 in an electronic device such as, for example, a television.

In various embodiments, the display interface 660 may include a display driver, such as, for example, a timing controller (T Con) chip.

The display 661 and speaker 671 may alternatively be separate from one or more of the other components, for example, if the RF portion of input 690 is part of a separate set-top box. In various embodiments in which the display 661 and speakers 671 may be external components, the output signal may be provided via dedicated output connections, including, for example, HDMI ports, USB ports, or COMP outputs.

In FIGS. 1-25, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer-readable storage medium. A computer-readable storage medium may take the form of a computer-readable program product embodied in one or more computer-readable medium(s) and having computer-readable program code embodied thereon that is executable by a computer. A computer-readable storage medium as used herein may be considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer-readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 610 or by hardware, or by a combination of hardware and software. As a non-limiting example, the embodiments may be also implemented by one or more integrated circuits. The memory 620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 610 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to a first aspect of the present application, there is provided a method for encoding a video picture into a bitstream of encoded video picture data. The method comprises splitting the video picture into rectangular picture areas, a size of at least one of said rectangular picture area being different from an integer multiple of a default size of coding-tree unit encoded into the bitstream; determining a grid of coding-tree units for each rectangular picture area, a grid of coding-tree units representing a spatial partition of a rectangular picture area, each coding-tree unit representing a sub-area of a rectangular picture area, said sub-area being subdivided according to a coding tree; obtaining encoded video picture data by encoding at least one coding unit of a coding tree associated with each coding tree unit of each grid of coding-tree unit; and writing the encoded video data into the bitstream.

In one exemplary embodiment, the method further comprises encoding into the bitstream, partitioning information data representative of each grid of coding-tree units.

In one exemplary embodiment, the video picture is split into rectangular picture areas to separate picture areas with low spatial activity from picture areas with high spatial activity of the video picture.

In one exemplary embodiment, the spatial activity of the video picture is determined by detecting vertical and horizontal edges from the video picture content.

In one exemplary embodiment, the video picture is split according to a decomposition tree and at least one leaf of the decomposition tree is a rectangular picture area.

In one exemplary embodiment, the decomposition tree is a binary decomposition tree, and wherein a split line offset is encoded into the bitstream to indicate the position of a line splitting a picture area associated with a parent into two sub-areas associated with two child nodes.

According to a second aspect of the present application, there is provided a method of decoding a video picture from a bitstream of encoded video picture data. The method comprises determining multiple grids of coding-tree units; each grid of coding-tree units covering a rectangular picture area of the video picture; a size of at least one rectangular picture area being different from an integer multiple of a default size of coding-tree unit decoded from the bitstream; each coding-tree unit representing a sub-area of a rectangular picture area, said sub-area being subdivided according to a coding tree; obtaining video picture data by decoding at least one coding unit of a coding tree associated with each coding tree unit of each grid of coding-tree units from the bitstream; and obtaining the video picture from said video picture data.

In one exemplary embodiment, the multiple grids of coding-tree units are determined from partitioning information data decoded from the bitstream.

In one exemplary embodiment, the rectangular picture areas are defined from sub-pictures, tiles or slices, each tile being a sequence of coding-tree units, a slice comprising an integer number of tiles or an integer number of consecutive coding-tree unit rows within a tile, each of said coding-tree units having a size equals to the default size.

In one exemplary embodiment, a single grid of coding-tree units is determined by partitioning a rectangular picture area, and wherein said grid of coding-tree units is used for encoding/decoding each component of said rectangular picture area.

In one exemplary embodiment, a grid of coding-tree units is determined per component of a rectangular picture area.

According to a third aspect of the present application, there is provided a bitstream formatted to include encoded video picture data and obtained from a method according to the first aspect of the present application.

According to a fourth aspect of the present application, there is provided an apparatus comprising means for performing one of methods according to the first and/or second aspects of the present application.

According to a fifth aspect of the present application, there is provided a computer program product including instructions which, when the program is executed by one or more processors, causes the one or more processors to carry out a method according to the first and/or second aspects of the present application.

According to a seventh aspect of the present application, there is provided a non-transitory storage medium carrying instructions of program code for executing a method according to the first and/or second aspects of the present application.

The specific nature of at least one of the exemplary embodiments as well as other objects, advantages, features and uses of said at least one of exemplary embodiments will become evident from the description of examples taken in conjunction with the drawings.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout the present application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the present application are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video picture (including possibly a received bitstream which encodes one or more video picture) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present application, for example.

As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present application may encompass all or part of the processes performed, for example, on an input video picture in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the an.

Additionally, the present application may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments the encoder signals a particular information such as coding parameter or encoded video picture data. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a video picture into a bitstream of encoded video picture data, wherein the method comprises:

splitting the video picture into rectangular picture areas, a size of at least one rectangular picture area being different from an integer multiple of a default size of coding-tree unit encoded into the bitstream;

determining a grid of coding-tree units for each rectangular picture area, the grid of coding-tree units representing a spatial partition of a rectangular picture area, each coding-tree unit representing a sub-area of a rectangular picture area, the sub-area being subdivided according to a coding tree;

obtaining encoded video picture data by encoding at least one coding unit (CU) of a coding tree associated with each coding tree unit (CTU) of each grid of coding-tree unit; and writing the encoded video picture data into the bitstream;

wherein the video picture is split into the rectangular picture areas to separate picture areas with low spatial activity from picture areas with high spatial activity of the video picture;

wherein a spatial activity of each picture area is determined by detecting vertical and horizontal edges from the picture area;

wherein a length of each vertical edge and a length of each horizontal edge are greater than or equal to a threshold, and the threshold is determined based on at least one of a width of the video picture, a height of the video picture, or a size of the CTU.

2. The method of claim 1, further comprising:

encoding, into the bitstream, partitioning information data representative of each grid of coding-tree units.

3. The method of claim 1, wherein a spatial activity of the video picture is determined by detecting vertical and horizontal edges from video picture content.

4. The method of claim 1, wherein the video picture is split according to a decomposition tree and at least one leaf of the decomposition tree is a rectangular picture area.

5. The method of claim 4, wherein the decomposition tree is a binary decomposition tree, and wherein a split line offset is encoded into the bitstream to indicate a position of a line splitting a picture area associated with a parent into two sub-areas associated with two child nodes.

6. An apparatus, comprising:

a processor; and a memory storing programs executable by the processor;

wherein the processor is configured to execute the programs to perform the method of claim 1.

7. A non-transitory storage medium storing instructions of program code that, when executed by a processor, causes the processor to perform the method of claim 1.

8. A method of decoding a video picture from a bitstream of encoded video picture data, wherein the method comprises:

determining multiple grids of coding-tree units;

each grid of coding-tree units covering a rectangular picture area of the video picture;

a size of at least one rectangular picture area being different from an integer multiple of a default size of coding-tree unit decoded from the bitstream;

each coding-tree unit representing a sub-area of a rectangular picture area, the sub-area being subdivided according to a coding tree;

obtaining video picture data by decoding at least one coding unit (CU) of a coding tree associated with each coding tree unit (CTU) of each grid of coding-tree units from the bitstream; and obtaining the video picture from the video picture data;

wherein the video picture is split into rectangular picture areas to separate picture areas with low spatial activity from picture areas with high spatial activity of the video picture;

wherein a spatial activity of each picture area is determined by detecting vertical and horizontal edges from the picture area;

wherein a length of each vertical edge and a length of each horizontal edge are greater than or equal to a threshold, and the threshold is determined based on at least one of a width of the video picture, a height of the video picture, or a size of the CTU.

9. The method of claim 8, wherein the multiple grids of coding-tree units are determined from partitioning information data decoded from the bitstream.

10. The method of claim 8, wherein the rectangular picture areas are defined from sub-pictures, tiles or slices, each tile being a sequence of coding-tree units, a slice comprising an integer number of tiles or an integer number of consecutive coding-tree unit rows within a tile, each of the coding-tree units having as size equals to the default size.

11. The method of claim 8, wherein a single grid of coding-tree units is determined by partitioning a rectangular picture area, and wherein the grid of coding-tree units is used for encoding/decoding each component of the rectangular picture area.

12. The method of claim 8, wherein a grid of coding-tree units is determined per component of a rectangular picture area.

13. A non-transitory storage medium storing instructions of program code that, when executed by a processor, causes the processor to perform the method of claim 8.

14. An appartatus, comprising:

a processor; and a memory storing programs executable by the processor;

wherein the processor is configured to execute the programs to perform;

determining multiple grids of coding-tree units;

each grid of coding-tree units covering a rectangular picture area of a video picture;

a size of at least one rectangular picture area being different from an integer multiple of a default size of coding-tree unit decoded from a bitstream;

each coding-tree unit representing a sub-area of a rectangular picture area, the sub-area being subdivided according to a coding tree;

obtaining video picture data by decoding at least one coding unit (CU) of a coding tree associated with each coding tree unit (CTU) of each grid of coding-tree units from the bitstream; and obtaining the video picture from the video picture data;

wherein the video picture is split into rectangular picture areas to separate picture areas with low spatial activity from picture areas with high spatial activity of the video picture;

wherein a spatial activity of each picture area is determined by detecting vertical and horizontal edges from the picture area;

wherein a length of each vertical edge and a length of each horizontal edge are greater than or equal to a threshold, and the threshold is determined based on at least one of width of the video picture, a height of the video picture, or a size of the CTU.

15. The apparatus of claim 14, wherein the multiple grids of coding-tree units are determined from partitioning information data decoded from the bitstream.

16. The apparatus of claim 14, wherein the rectangular picture areas are defined from sub-pictures, tiles or slices, each tile being a sequence of coding-tree units, a slice comprising an integer number of tiles or an integer number of consecutive coding-tree unit rows within a tile, each of the coding-tree units having a size equals to the default size.

17. The apparatus of claim 14, wherein a single grid of coding-tree units is determined by partitioning a rectangular picture area, and wherein the grid of coding-tree units is used for encoding/decoding each component of the rectangular picture area.

18. The apparatus of claim 14, wherein a grid of coding-tree units is determined per component of a rectangular picture area.

* * * * *